(12) United States Patent
Seleznev et al.

(10) Patent No.: US 9,038,191 B2
(45) Date of Patent: May 19, 2015

(54) METHOD AND APPARATUS FOR PROVIDING DRM SERVICE

(75) Inventors: Sergey Nikolayevich Seleznev, Gyeonggi-do (KR); Byung-Rae Lee, Seoul (KR); Bo-Gyeong Kang, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/458,469

(22) Filed: Apr. 27, 2012

(65) Prior Publication Data

US 2012/0291142 A1    Nov. 15, 2012

(30) Foreign Application Priority Data

Apr. 29, 2011  (KR) .................... 10-2011-0040880

(51) Int. Cl.
*G06F 7/04* (2006.01)
*G06F 17/30* (2006.01)
*H04N 7/16* (2011.01)
(Continued)

(52) U.S. Cl.
CPC ............ *H04N 21/8355* (2013.01); *G06F 17/30* (2013.01); *G06F 21/10* (2013.01); *H04N 21/2355* (2013.01); *H04N 21/4627* (2013.01); *H04L 63/102* (2013.01); *H04L 2463/101* (2013.01); *G06F 2221/0706* (2013.01); *G06F 2221/2101* (2013.01)

(58) Field of Classification Search
USPC ........... 705/59; 709/203, 222; 725/37, 39, 87; 726/9, 22, 26, 27, 28
See application file for complete search history.

(56) References Cited

U.S. PATENT DOCUMENTS

2003/0140009 A1   7/2003   Namba et al.
2004/0117618 A1*  6/2004   Kawaguchi et al. .......... 713/156
(Continued)

FOREIGN PATENT DOCUMENTS

EP      2 273 409        1/2011
JP      2003-022377      1/2003
(Continued)

OTHER PUBLICATIONS

Muhammad Rizwan Asghar, DRM Convergence: Interoperability between DRM Systems, Aug. 2009.*
(Continued)

*Primary Examiner* — Andrew Nalven
*Assistant Examiner* — Huan V Doan
(74) *Attorney, Agent, or Firm* — The Farrell Law Firm, P.C.

(57) ABSTRACT

Methods and apparatus are provided for providing a DRM service by a user terminal apparatus consuming DRM content in a service environment that provides the DRM content using a plurality of incompatible DRM systems. A license corresponding to the DRM content is acquired from a service providing apparatus that provides the DRM content. It is determined whether the license is a common license having a common DRM interface format. The common DRM interface format of the common license is converted to a format of a first DRM system installed in the user terminal apparatus, when the license is the common license. The license having the format of the first DRM system is applied in reproducing the DRM content. The common license is provided from the service providing apparatus to the user terminal apparatus through a common DRM interface when the service providing apparatus does not support the first DRM system.

21 Claims, 8 Drawing Sheets

(51) Int. Cl.
*H04N 21/8355* (2011.01)
*G06F 21/10* (2013.01)
*H04N 21/235* (2011.01)
*H04N 21/4627* (2011.01)
*H04L 29/06* (2006.01)

(56) References Cited

U.S. PATENT DOCUMENTS

| | | | |
|---|---|---|---|
| 2005/0027871 A1* | 2/2005 | Bradley et al. | 709/227 |
| 2005/0216763 A1* | 9/2005 | Lee et al. | 713/200 |
| 2005/0278787 A1* | 12/2005 | Naslund et al. | 726/26 |
| 2006/0085826 A1* | 4/2006 | Funk et al. | 725/87 |
| 2006/0117391 A1* | 6/2006 | Kim | 726/27 |
| 2006/0232449 A1 | 10/2006 | Jain et al. | |
| 2008/0046758 A1* | 2/2008 | Cha et al. | 713/189 |
| 2008/0114693 A1* | 5/2008 | Jogand-Coulomb et al. | 705/59 |
| 2008/0126801 A1* | 5/2008 | Lee et al. | 713/167 |
| 2008/0205643 A1* | 8/2008 | Chen | 380/205 |
| 2009/0089884 A1* | 4/2009 | Watson et al. | 726/28 |
| 2009/0100465 A1* | 4/2009 | Kulakowski | 725/39 |
| 2009/0165080 A1 | 6/2009 | Fahn et al. | |
| 2009/0199287 A1* | 8/2009 | Vantalon et al. | 726/9 |
| 2010/0082743 A1* | 4/2010 | Zeng et al. | 709/203 |

FOREIGN PATENT DOCUMENTS

| | | |
|---|---|---|
| JP | 2008-538840 | 11/2008 |
| KR | 1020030022819 | 3/2003 |
| WO | WO 2006/054987 | 5/2006 |

OTHER PUBLICATIONS

Donghyun Choi et al., "Protection Profile for Connected Interoperable DRM Framework", Information Security Applications, Sep. 23, 2008.

* cited by examiner

METHOD AND APPARATUS FOR PROVIDING DRM SERVICE

PRIORITY

This application claims priority under 35 U.S.C. §119(a) of an application entitled "Method and Apparatus for Providing DRM Service" filed in the Korean Intellectual Property Office on Apr. 29, 2011 and assigned Serial No. 10-2011-0040880, the contents of which are incorporated herein by reference.

BACKGROUND OF THE INVENTION

1. Field of the Invention

The present invention relates generally to Digital Rights Management (DRM), and more particularly, to a method and an apparatus for providing a DRM service in a user terminal regardless of a DRM system type.

2. Description of the Related Art

Methods for distributing digital contents to user terminals, such as televisions, computers, and portable devices, have become one of the biggest issues in the current digital age.

A DRM service refers to technology that continuously manages and protects intellectual property rights of digital contents by using an encryption technique. Specifically, the DRM service safely transfers various contents from a Content Provider (CP) to a user and prevents the user from illegally distributing the contents. Such DRM technology can protect information during processes of creating, distributing, using, and discarding the digital contents, and can protect the use according to a user's authority and the rights of the user.

In order to use content to which the DRM technology is applied (hereinafter, referred to as a "DRM content"), the user terminal first accesses a system that provides the corresponding DRM content in order to download the DRM content, meta data for the DRM content, and a license. The meta data refers to data storing information on the DRM content, and the license refers to data indicating a decryption key used for decrypting encrypted DRM content and a content access right (e.g., the number of times, a period, etc.). Once the DRM content and the license are stored through such a process, the user terminal can use the corresponding DRM content. Accordingly, the user terminal should be equipped with a DRM agent capable of executing a corresponding DRM solution in order to use the DRM content.

There are various types of DRM systems and Conditional Access (CA) systems in the market. For example, the types of systems include an Open Mobile Alliance (OMA) DRM system, a marlin DRM system, a widevine DRM system. Such DRM systems are similar in that they provide digital content after encrypting the corresponding digital content and providing an access right for the corresponding digital content. Specifically, the DRM systems are similar in that they use the license, but they differ in a format or a language used to express the license and also differ in a message format used for executing the DRM service. Accordingly, when a DRM system used by the service provider providing the DRM content is different from a DRM system supported by the user terminal, an interoperability problem may occur.

FIG. 1 is a diagram illustrating an interoperability problem. FIG. 1 illustrates a DRM A system 20, a DRM B system 30, and a DRM C system 40, which correspond to different types of DRM systems, on a DRM solution market. An Internet Protocol Television (IP TV) providing apparatus 10, corresponding to the service provider, uses the DRM A system 20. Further, an IP TV terminal A 50 and an IP TV terminal B 60, corresponding to user terminals, are equipped with a solution of the DRM A system 20 and a solution of the DRM C system 40, respectively.

The IP TV terminal A 50 can receive an IP TV service from the IP TV providing apparatus 10, but the IP TV terminal B 60 cannot receive the IP TV service from the IP TV providing apparatus 10.

Accordingly, when the user purchases a user terminal simply according to a user's preference, the user may not receive a service through access to the service provider.

A method of downloading a DRM solution required by the user terminal may be used to solve the above-described problem. In this method, the user terminal downloads and installs software components of a DRM system used for content protection.

However, the method requires that the safety of a higher level, implemented in a hardware level, be ensured. Further, since conventional DRM systems and CA systems are generally not designed to perform a downloading operation, there is complexity in implementation.

As another solution to solve the above-described problem, a method may be provided to force the service provider into simultaneously supporting a plurality of DRM systems. The user can select and purchase a user terminal supporting one DRM system from the plurality of DRM systems. However, this method may act as overhead to the service provider.

SUMMARY OF THE INVENTION

The present invention has been made to address at lest the above problems and/or disadvantages and to provide at least the advantages described below. Accordingly, an aspect of the present invention provides a method and an apparatus that can use a plurality of DRM systems regardless of a type of a DRM system supported by a user terminal selected by a user.

Another aspect of the present invention provides a method and an apparatus that can smoothly provide a service even when the service provider does not support a plurality of DRM systems.

An additional aspect of the present invention provides a method and an apparatus in which the user terminal implementing one DRM system can receive a service from various service providers.

A further aspect of the present invention provides a method and an apparatus in which compatibility is possible between a plurality of DRM systems without great changes in implementations of the conventional DRM system and the CA system.

In accordance with an aspect of the present invention, a user terminal apparatus is provided for consuming DRM content and providing a DRM service in a service environment that provides the DRM content by using a plurality of incompatible DRM systems. The user terminal apparatus includes a transceiver and a DRM agent for supporting a first DRM system. The user terminal apparatus also includes a DRM proxy server agent for acquiring, through the transceiver, a license corresponding to the DRM content from a service providing apparatus that provides the DRM content, determining whether the license is a common license having a common DRM interface format, converting the common DRM interface format of the common license to a format of the first DRM system installed in the user terminal apparatus when the license is the common license, and transferring the license to the DRM agent. The common license is provided from the service providing apparatus to the user terminal apparatus through a common DRM interface when the service providing apparatus does not support the first DRM system.

In accordance with another aspect of the present invention, a method is provided for providing a DRM service by a user terminal apparatus consuming DRM content in a service environment that provides the DRM content by using a plurality of incompatible DRM systems. A license corresponding to the DRM content is acquired from a service providing apparatus that provides the DRM content. It is determined whether the license is a common license having a common DRM interface format. The common DRM interface format of the common license is converted to a format of a first DRM system installed in the user terminal apparatus, when the license is the common license. The license having the format of the first DRM system is applied in reproducing the DRM content. The common license is provided from the service providing apparatus to the user terminal apparatus through a common DRM interface when the service providing apparatus does not support the first DRM system.

In accordance with an additional embodiment of the present invention, a method is provided for providing a DRM service by a service providing apparatus that provides DRM content in a service environment that provides the DRM content by using a plurality of incompatible DRM systems. A license corresponding to the DRM content is generated. The license has a format of a first DRM system supported by the service providing apparatus. The format of the license is converted to a common DRM interface format when a user terminal apparatus that is to receive the license is equipped with a second DRM system that is different than the first DRM system. The license is transmitted to the user terminal apparatus through a common DRM interface.

In accordance with a further embodiment of the present invention, a service providing apparatus is provided for providing DRM content and providing a DRM service in a service environment that provides the DRM content by using a plurality of incompatible DRM systems. The service providing apparatus includes a service provider for storing information on types of DRM systems installed in a plurality of user terminal apparatuses. The service providing apparatus also includes a DRM server for supporting a first DRM system and generating a license corresponding to the DRM content. The license has a format of the first DRM system. The service providing apparatus further includes a common domain manager for, when a user terminal apparatus that is to receive the license is equipped with a second DRM system that is different than the first DRM system, converting the format of the license to a common DRM interface format and transmitting the license to the user terminal apparatus through the common DRM interface.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
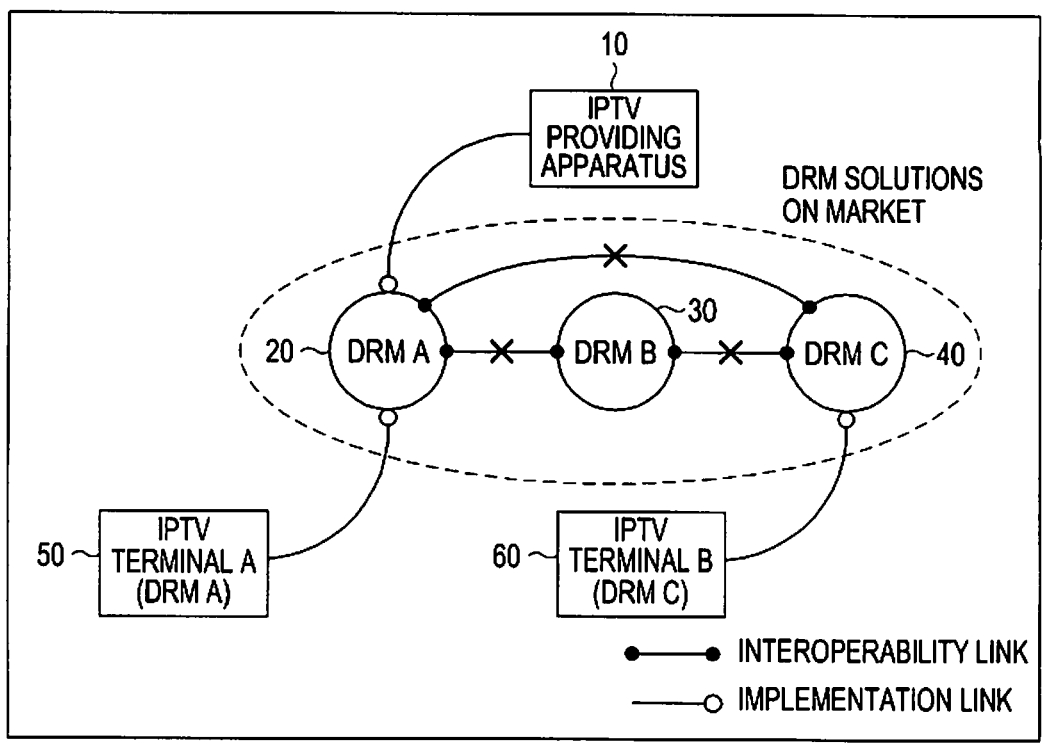
FIG. 1 is a diagram illustrating a conventional DRM system environment.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

In a service system providing a digital content (DRM content) to which DRM technology is applied, embodiments of the present invention have been made to, enable a user terminal to use DRM content obtained from a service provider even when the service provider and the user terminal support different types of DRM systems.

Embodiments of the present invention propose a CDI and a CDI protocol. The CDI refers to an interface defined between the service provider and the user terminal to provide license information required for DRM content execution in a format, which can be recognized by the user terminal, when the service provider and the user terminal do not use the same type of DRM system.

Specifically, when a DRM system installed in the user terminal is not a specific DRM system supported by the service provider, a common license in a CDI format is transferred to the corresponding user terminal, instead of a license according to a format of the specific DRM system.

Once the user terminal receives the common license, the user terminal converts the format of the common license to a specified format by the DRM system installed in the user terminal and applies the converted format in reproducing the corresponding DRM content. The license refers to information indicating a decryption key used for decrypting encrypted DRM content and an access right for the DRM content, for example, the number of times, a period, etc.

Figure 2:
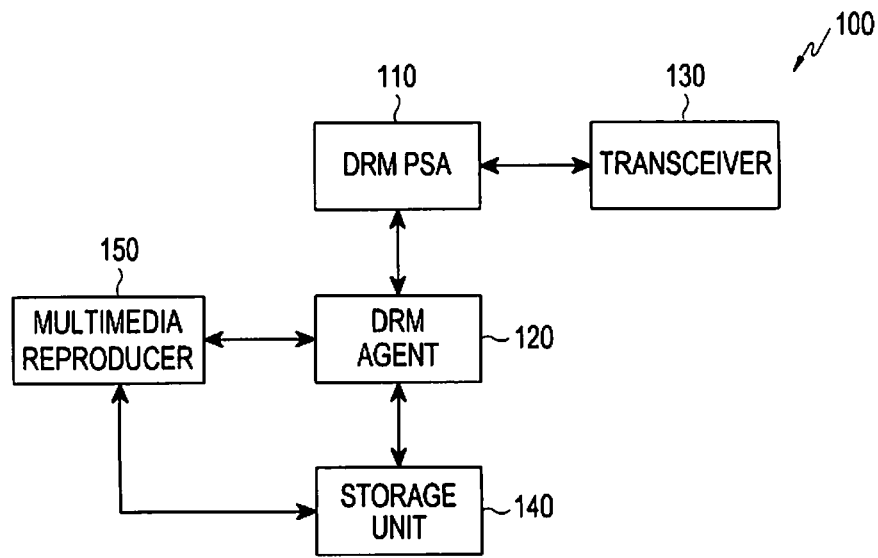
FIG. 2 is a diagram illustrating a construction of a user terminal, according to an embodiment of the present invention.
Figure 3:
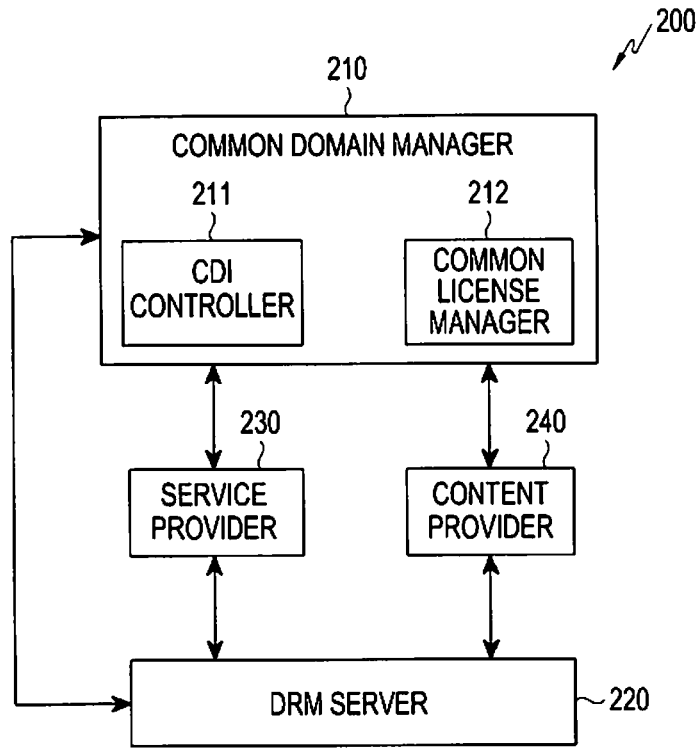
FIG. 3 is a diagram illustrating a construction of a service providing apparatus, according to an embodiment of the present invention.

Examples of the user terminal and the service provider to which embodiments of the present invention are applied are illustrated in FIGS. 2 and 3, respectively. FIG. 2 is a diagram illustrating a construction of the user terminal, according to an embodiment of the present invention. A user terminal 100 is an apparatus that consumes DRM content by requesting, receiving, and reproducing the DRM content, and may be embodied as, for example, a television, a mobile phone, a Portable Media Player (PMP), or a music file reproducing apparatus.

FIG. 3 is a diagram illustrating a construction of the service providing apparatus corresponding to the service provider, according to an embodiment of the present invention. A service providing apparatus 200 is an apparatus that provides various types of digital contents to a user terminal subscribing to a multimedia service and manages information on a user subscribing to the service. Accordingly, the service providing apparatus 200 plays the role of service provider for managing a user's account, registering the user terminal, and providing the multimedia service, and may be embodied as an apparatus for providing an IP TV service.

The construction of the user terminal 100 is described with reference to FIG. 2. As shown in FIG. 2, the user terminal 100 includes a DRM Proxy Server Agent (PSA) 110, a DRM agent 120, a transceiver 130, a storage unit 140, and a multimedia reproducer 150.

The multimedia reproducer 150 reproduces and outputs digital content received through a multimedia service under the control of the DRM agent 120.

The transceiver 130 transmits/receives a message or data to/from a network or other apparatuses, transfers the received message or data to the DRM PSA 110, and transmits the data or message transferred from the DRM PSA 110 to a corresponding network entity.

The storage unit 140 stores various types of renewable data, reference data, and a program for processing and controlling the user terminal 100, and provides the stored data and the program to a working memory of the DRM agent 120. Further, the storage unit 140 stores various types of digital contents received through the multimedia service.

The DRM agent 120 performs an operation of applying a DRM in executing the DRM content. Accordingly, the DRM agent 120 performs operations related to requesting a multimedia service, acquiring a license required for executing the requested multimedia service, and applying the acquired license, controls operations of respective elements of the user terminal 100, which are related to the operations of the DRM agent 120, and processes and generates related messages.

The DRM agent 120 is implemented according to a standard of one type of DRM system. For example, the DRM agent 120 may be a DRM agent according to a standard of one DRM system, selected from among an OMA DRM system, a marlin DRM system, and a widevine DRM system.

The DRM PSA 110 provides a CDI between the service providing apparatus 200 and the user terminal 100, according to embodiments of the present invention. Specifically, the DRM PSA 110 converts a format of a message, which is received from the service providing apparatus 200 to be transferred to the DRM agent 120, or a format of information included in the received message to a format specified by the DRM agent 120, and transfers the message to the DRM agent 120. Further, the DRM PSA 110 converts a format of a message, which is received from the DRM agent 120 to be transferred to the service providing apparatus 200, or a format of information included in the received message to a CDI format, and transfers the message to the service providing apparatus 200.

Figure 4:
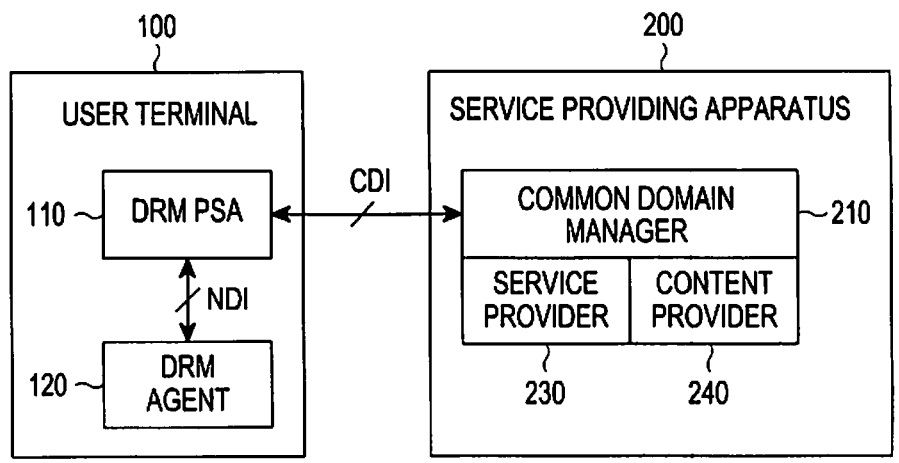
FIGS. 4 to 6 are diagrams illustrating interface relations between the service providing apparatus and the user terminal, according to embodiments of the present invention.

Communication between the DRM PSA 110 and the DRM agent 120 is performed based on a protocol according to a standard of the DRM system related to the DRM agent 120. A communication interface between the DRM PSA 110 and the DRM agent 120 is referred to as a Native DRM Interface (NDI) in embodiments of the present invention. The interface between the user terminal 100 and the service providing apparatus 200 and the interface between the DRM PSA 110 and the DRM agent 120 are illustrated in greater detail in FIG. 4, according to an embodiment of the present invention.

Accordingly, the DRM PSA 110 can be distinguished according to the type of DRM system, and thus, the types for distinguishing the DRM PSA 110 are defined. For example, there may be an OMA type for the OMA DRM system, a marlin type for the marlin DRM system, or a widevine type for the widevine DRM system. However, between the service providing apparatus 200 and the DRM PSA 100, the CDI proposed in embodiments of the present invention is shared regardless of the type of the DRM PSA 110. The DRM PSA 110 can be installed in the user terminal 100 in advance or installed after it is downloaded.

Figure 5:
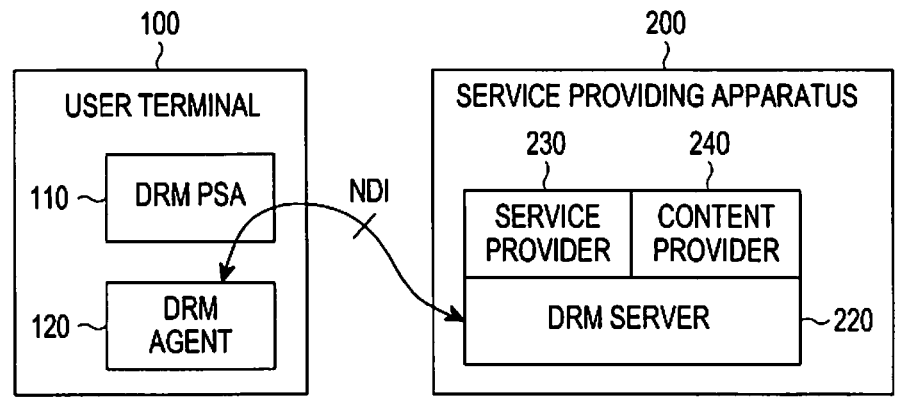

When DRM systems implemented in the service providing apparatus 200 and the user terminal 100 are equal to each other, the DRM PSA 110 can simply bypass the communication. Specifically, the DRM PSA 110 can transfer the message received from the service providing apparatus 100 to the DRM agent 120 without any processing of the message, as illustrated in FIG. 5, according to an embodiment of the present invention. Specifically, if the DRM agent 120 and a DRM server 220 of the service providing apparatus 200 use the same type of DRM system, communication between the service providing apparatus 200 and the user terminal 100 is performed by the NDI.

For reference, the DRM content can be transferred to the user terminal 100 in a common file format type or in a form subordinate to a specific DRM system.

Referring to FIG. 3, the service providing apparatus 200 includes a common domain manager 210, a service provider 230, a content provider 240, and the DRM server 220.

The content provider 240 stores a plurality of digital contents, encrypts the digital content by using an encryption key transferred from the DRM server 220 to generate DRM content, and transfers the DRM content to the common domain manager 210. A format of the encrypted digital content may be the common file format.

The DRM server 220 is implemented according to a standard of one type of DRM system, performs various processing procedures for providing a DRM service to the user terminal through interworking with the service provider 230, and generates information and a message.

The DRM server 220 determines the encryption key for encrypting specific digital content and determines an access right to be applied to the corresponding digital content. Further, the DRM server 220 transfers a license including information on the decryption key capable of decrypting the encrypted digital content and the access right to the common domain manager 210. A format of the license is a format of the DRM system supported by the DRM server 220. Further, the information on the decryption key and the access right can be the decryption key and the access right themselves, or address information for acquiring the decryption key and the access right.

The DRM server 220 generates various messages for providing the DRM service to the user terminal 100. The various messages are related to registering the user terminal, sending various instructions and responses for providing the license, and managing the DRM solution installed in the user terminal 100. Such messages are transferred to the common domain manager 210.

The DRM server 220 is implemented according to standards of one or more types of DRM systems. For example, the DRM server 220 can comply with a standard of one DRM system from among the OMA DRM system, the marlin DRM system, and the widevine DRM system.

The service provider 230 controls operation processes related to managing a user's account, registering the user terminal, and providing a service, for example. The service provider 230 stores identification information on the user terminal together with the DRM system type installed in the corresponding user terminal. When the service provider 230 tries to provide the service to the user terminal, if the type of the DRM system installed in the corresponding user terminal does not correspond to a DRM system supported by the DRM server 220, the service provider 230 transfers a CDI application notice to the common domain manager 210.

The common domain manager 210 is a functional unit for providing the CDI, and includes a CDI controller 211 and a common license manager 212.

The common license manager 212 manages the license transferred from the DRM server 220, and converts a format of the license to a CDI format, under the control of the CDI controller 211, to configure a common license.

Once the CDI controller 211 receives the CDI application notice involved with the user terminal having received the specific DRM content from the service provider 230, the CDI controller 211 performs provides a DRM service corresponding to the specific DRM content by means of the CDI. Specifically, the CDI controller 211 converts a format of a message received from the DRM server 220 or a format of information included in the message to the CDI format, and transmits the message to the user terminal. Further, the CDI controller 211 converts a format of a message received from the user terminal or a format of information included in the message to a format of the DRM system specified by the DRM server 220, and transfers the message to the DRM server 220.

When the CDI application notice for the specific DRM content involved with the user terminal is not received from the service provider 230 or a CDI non-application notice is received, the CDI controller 211 directly transmits the information or message received from the DRM server 220 to the corresponding user terminal without any change.

Figure 6:
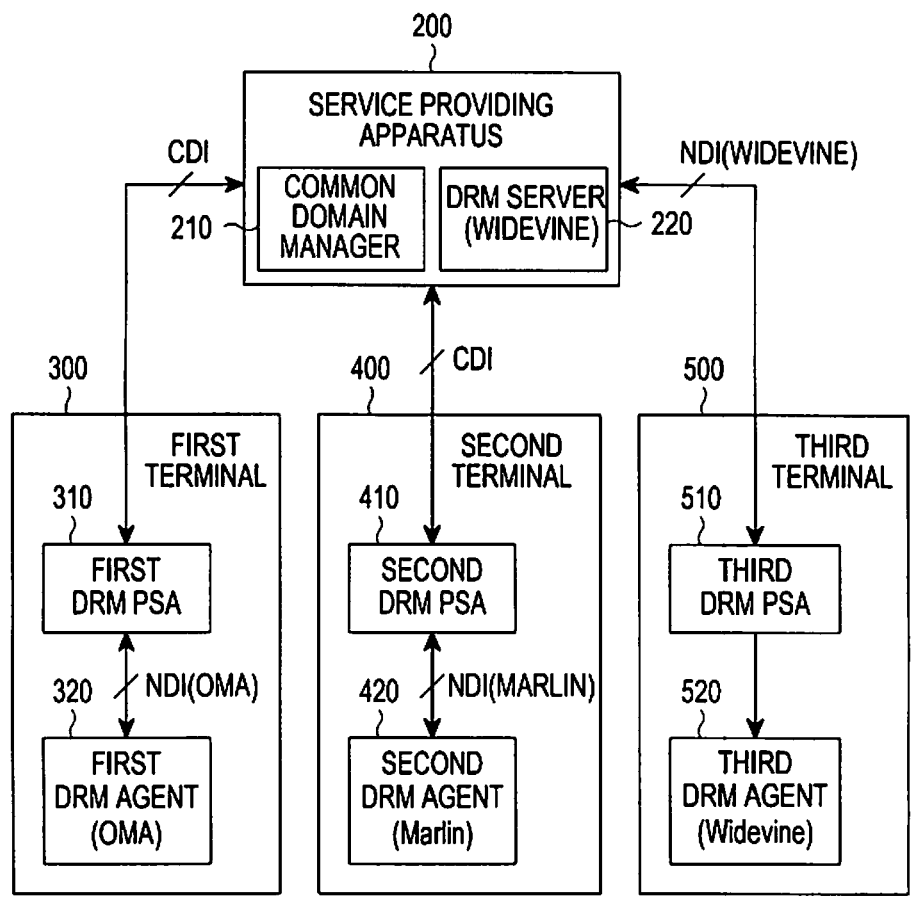

FIG. 6 is a diagram illustrating an interface relation for providing the DRM service between the user terminal 100 and the service providing apparatus 200, according to an embodiment of the present invention.

A first terminal 300, a second terminal 400, and a third terminal 500 have constructions similar to that of the user terminal 100 in FIG. 2. However, the first terminal 300 includes a first DRM agent 320 according to a standard of the OMA DRM system and a first DRM PSA 310 of the OMA type. The second terminal 400 includes a second DRM agent 420 according to a standard of the marlin DRM system and a second DRM PSA 410 of the marlin type. The third terminal 500 includes a third DRM agent 520 according to a standard of the widevine DRM system and a third DRM PSA 510 of the widevine type. It is assumed that the service providing apparatus 200 includes the DRM server 220 supporting the widevine DRM system.

A look at a communication interface used in providing the DRM service between the first, second and third terminals 300, 400, and 500 and the service providing apparatus 200 suggests that the first terminal 300 and the second terminal 400 include DRM systems that are different from the DRM system of the service providing apparatus 200, so that communication between the first DRM PSA 310 and the service providing apparatus 200 and between the second DRM PSA 410 and the service providing apparatus 200 is performed through the CDI. Further, communication between the first DRM PSA 310 and the first DRM agent 320 and between the second DRM PSA 410 and the second DRM agent 420 is performed through the NDI.

Since the third terminal 500 includes the same DRM system as that of the service providing apparatus 200, the third DRM agent 520 plays only a role of passing the message or information, and communication between the third terminal 500 and the service providing apparatus 200 is performed through the NDI.

Figure 7:
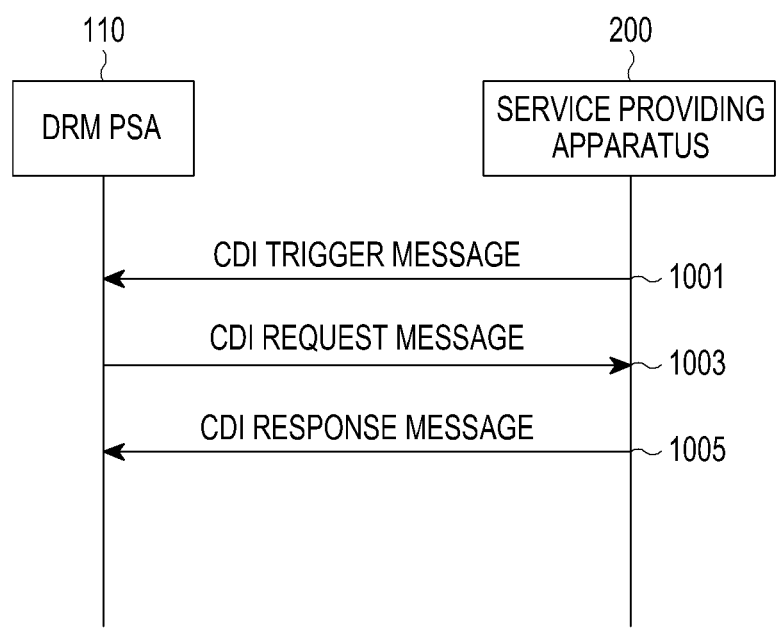
FIG. 7 is a diagram illustrating a Common DRM Interface (CDI) protocol, according to an embodiment of the present invention.

FIG. 7 is a diagram illustrating a CDI protocol, according to an embodiment of the present invention. The CDI protocol enables DRM service related communication between the service providing apparatus 200 and the user terminal 100 to be performed, and a CDI message may include a CDI trigger message 1001 transferred from the service providing apparatus 200 to the DRM PSA 110 of the user terminal 100, a CDI request message 1003 transferred from the DRM PSA 110 to the service providing apparatus 200, and a CDI response message 1005 transferred from the service providing apparatus 200 to the DRM PSA 110. Each message can be generated or processed by the common domain manager 210 or the DRM PSA 110, and main roles of the messages are as shown below in Table 1.

TABLE 1

| Message type | Description |
| --- | --- |
| CDI trigger message | This message requests a specific operation by the DRM PSA (e.g., a registration process between the DRM PSA and the DRM agent). The message includes a trigger type indicating an operation, which the DRM PSA should perform. |
| CDI request message | This message includes a request transferred to the service providing apparatus, and can be used for transferring information from the DRM agent to the service providing apparatus. The message includes a request type indicating a type of the request. |
| CDI response message | This message includes a response to the CDI request message, which transmitted from the service providing apparatus to the DRM PSA. |

Figure 8:
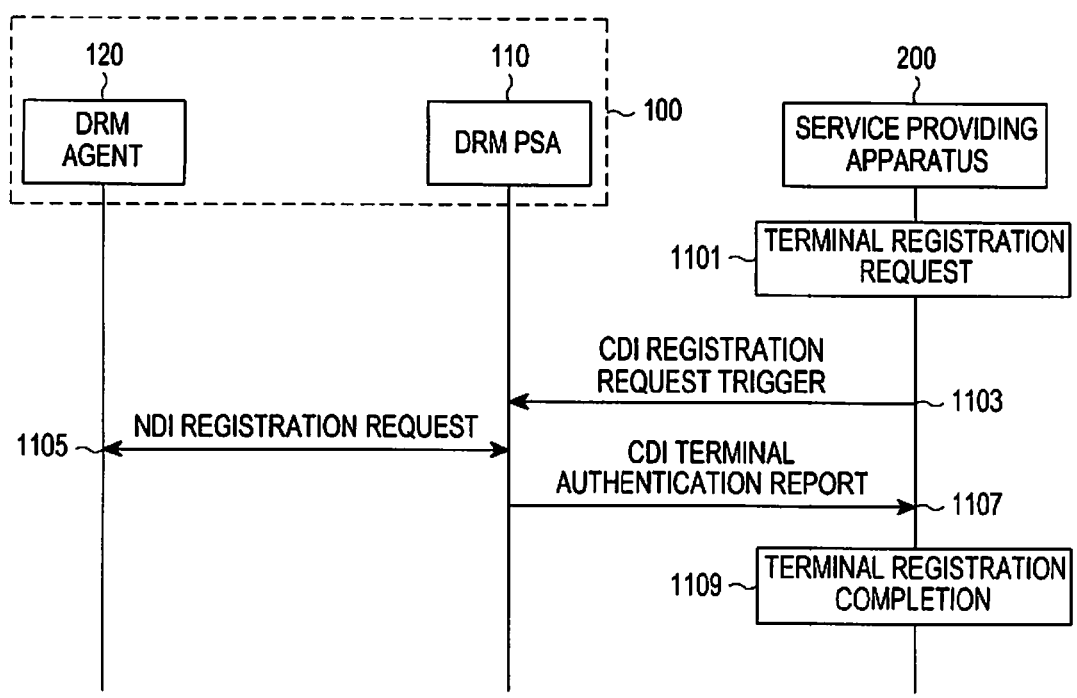
FIG. 8 is a diagram illustrating a process of registering the user terminal, according to an embodiment of the present invention.
Figure 9:
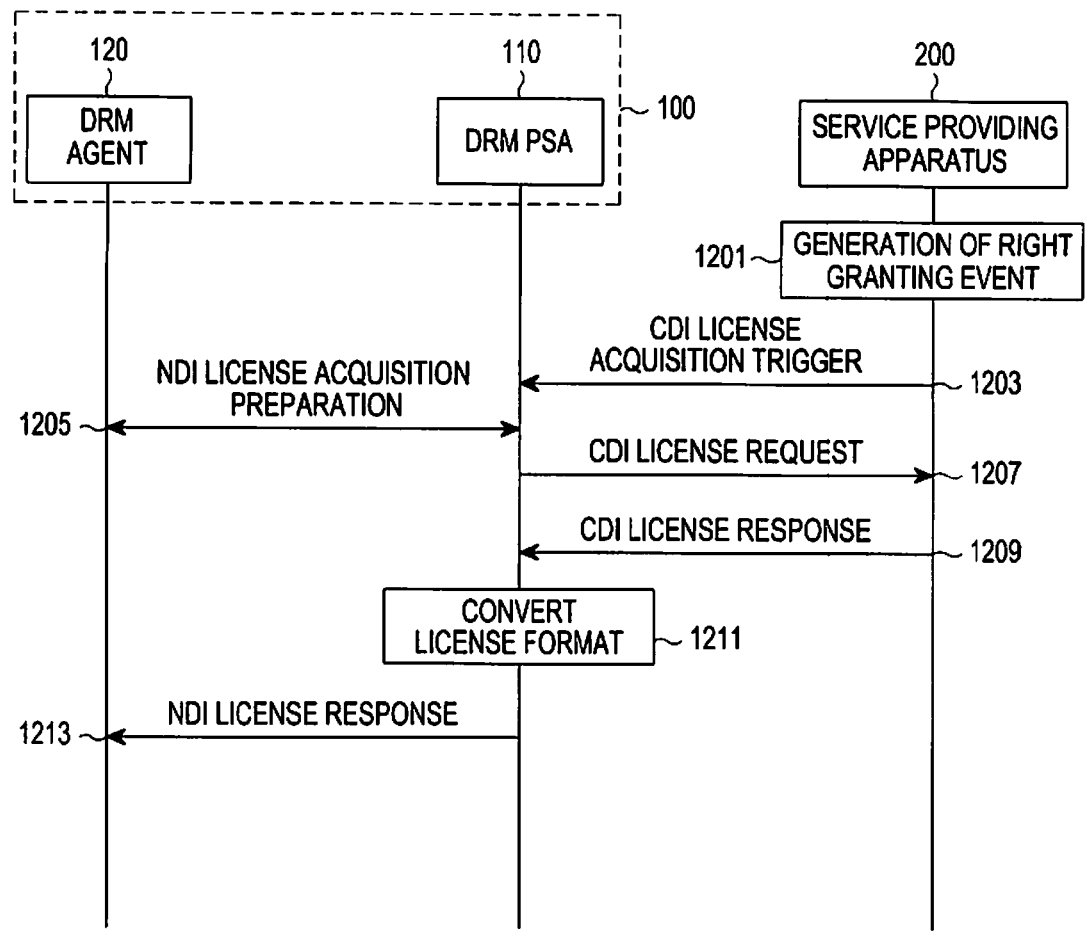
FIG. 9 is a diagram illustrating a process of obtaining a license, according to an embodiment of the present invention.
Figure 10:
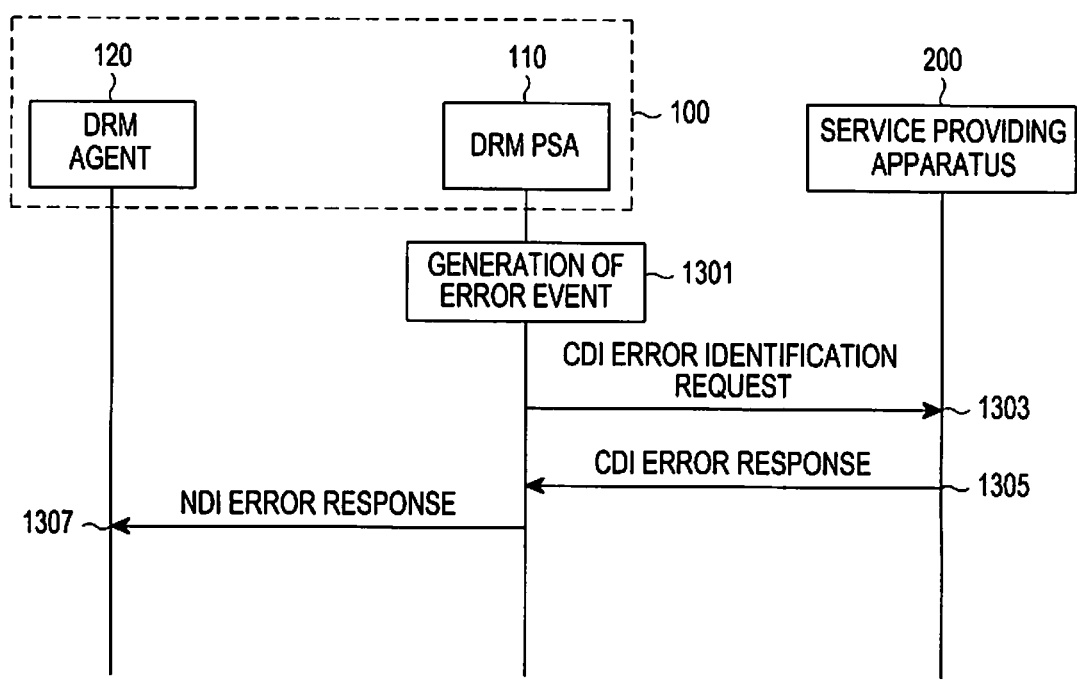
FIG. 10 is a diagram illustrating a process of resolving an error, according to an embodiment of the present invention.

FIGS. 8 to 10 are diagrams illustrating processes of registering the user terminal 100 in the service providing apparatus 200, acquiring a license corresponding to a specific DRM content, and resolving a DRM related error, according to embodiments of the present invention. In the embodiments of FIGS. 8 to 10, it is assumed that the user terminal 100 and the service providing apparatus 200 use different types of DRM systems.

FIG. 8 is a diagram illustrating a process of initially registering the user terminal 100 in the service providing apparatus 200, according to an embodiment of the present invention. The process includes a registration process specified to a specific DRM, which is performed between the DRM agent 120 and the DRM PSA 110, and a process in which the service providing apparatus 200 authenticates the DRM agent 120 through the DRM PSA 110.

The service providing apparatus 200 identifies that a registration request is generated for the new user terminal 100, in step 1101. The registration request may be received from the user terminal 100, or received from a service operator side as a user of the user terminal 100 subscribes to the service. Such a registration request can be provided to the common domain manager 210 by the service provider 230. The registration request for the user terminal may include information indicating that the user terminal 100 uses a different DRM system than that of the service providing apparatus 200.

The service providing apparatus 200 transfers the registration request message of the user terminal 100 by defining the trigger type of the CDI trigger message as "registration" and transmitting the CDI trigger message to the DRM PSA 110 of the user terminal 100, in step 1103.

When the user terminal 100 receives the CDI registration request trigger in step 1103, the DRM PSA 110 performs a terminal registration process with the DRM agent 120 according to a specific DRM system supported by the DRM agent 120, in step 1105. As the registration request of the user terminal is received through the CDI, the DRM PSA 110 can recognize that the service providing apparatus 200 does not support the DRM system corresponding to the DRM agent 120. Accordingly, when the DRM PSA 110 performs communication with the service providing apparatus 200, in order to execute the DRM service in the future, the CDI and the CDI protocol are used.

Since the service providing apparatus 200 does not support the DRM system specified by the user terminal 100, the DRM PSA 100 authenticates and registers the DRM agent 120 according to a protocol of the DRM system specified by the user terminal 100 on behalf of the service providing apparatus 200. Accordingly, the DRM PSA 110 stores information required for the authentication of the DRM agent 120, and can acquire the information required for the authentication of the DRM agent 120 from a network if necessary.

When the registration process is completed, the DRM PSA 110 informs the service providing apparatus 200 that the authentication and registration of the DRM agent 120 has been successfully completed, by defining the request type of the CDI request message as "terminal authorization" and transferring a CDI terminal authentication report message to the service providing apparatus 200, in step 1107. At this time, the CDI request message may include information indicating that the registration process dependent on the DRM is successfully completed, identification information of the user terminal 100, and a credential authenticated by the DRM PSA 110.

An example of the CDI request message is shown in Table 2 below.

TABLE 2

| Parameter | M/O | Description |
| --- | --- | --- |
| Terminal ID | M | Identification information of the user terminal according to a type of a DRM installed inside of the user terminal |
| Certificate Chain | M | A certificate chain of the DRM agent |
| Selected Algorithms | O | URIs of algorithms selected to protect confidential information |
| Session Credentials | O | This is a credential set between the DRM agent and the DRM PSA, and is encrypted with a public key of the service providing apparatus. |

When receiving the CDI request message in step 1107, the service providing apparatus 200 completes the registration process of registering the user terminal 100, in step 1109. The identification information of the user terminal 100 and the credential are linked to identification information of the DRM PSA 110. Further, information on the type of the DRM system installed in the user terminal 110 is stored according to the user terminal 110.

FIG. 9 is a diagram illustrating the process of obtaining the license by the user terminal 100 registered based on the process of FIG. 8, according to an embodiment of the present invention. The license transferred to the user terminal 100 may be a common license type of the CDI format.

Referring to FIG. 9, the service providing apparatus 200 detects the generation of a right granting event, in step 1201. The right granting event can be generated by a request for a specific DRM content by the user terminal 100 or generated when the service operator side desires to provide the specific DRM content to the user terminal.

Since the service providing apparatus 200 recognizes, through the terminal registering process, that the user terminal 100 does not use the DRM system supported by the service providing apparatus 200, the following processes are performed through the common domain manager 210. The service providing apparatus 200 transmits a request message for acquiring the license by designating the trigger type of the CDI trigger message as "license acquisition" and transmitting the CDI license acquisition trigger message to the user terminal 100, in step 1203. Accordingly, the CDI license acquisition trigger message may include license related information. For example, the CDI license acquisition trigger message may include identification information of the DRM content related to the license.

The CDI license acquisition trigger message may be constructed as defined in Table 3 below.

TABLE 3

| Parameter | M/O | Description |
| --- | --- | --- |
| Asset ID | O | This indicates a license to be acquired or identification information of a related DRM content. (e.g. it can be retrieved from a DRM content file) |

When the user terminal 100 receives the CDI trigger message in step 1203, the DRM PSA 110 prepares the license acquisition by transferring a request for the license acquisition to the DRM agent 120 through the NDI and executing a license acquisition protocol subordinate to the DRM system corresponding to the DRM agent 120 with the DRM agent 120, in step 1205.

When the DRM agent 120 is ready to receive the license, for example, when the DRM agent 120 transmits a license request message to the DRM PSA 110 through the NDI, the DRM PSA 110 requests the license from the service providing apparatus 200 by using the CDI request message, in step 1207. The request type of the CDI request message is designated as "license" and the CDI license request message may include license information included in the CDI trigger message or other information in order to identify the relationship between the CDI request message and the CDI trigger message received in step 1203. An example of the CDI license request message is as shown in Table 4 below.

TABLE 4

| Parameter | M/O | Description |
| --- | --- | --- |
| Asset ID | O | This indicates a license to be acquired or identification information of a related DRM content. (e.g. it can be retrieved from a DRM content file) |
| Trigger ID | O | This refers to identification information of the CDI trigger message, and links the license acquisition trigger message and the license request message. |

The service providing apparatus 200, having received the CDI license request message in step 1207, converts the corresponding license generated by the DRM server 220 to have a format of the DRM system supported by the DRM server 220 to the common license of the CDI format, includes the license in a CDI response message, and transmits the CDI response message to the user terminal 100, in step 1209. The response type of the CDI response message is designated as "license". An example of the CDI license response message is as shown in Table 5 below.

TABLE 5

| Parameter | M/O | Description |
| --- | --- | --- |
| Asset ID | M | This indicates a license to be acquired or identification information of a related DRM content. (e.g. it can be retrieved from a DRM content file) |
| Rights Descriptor | M | A generalized rule for an access right (permissions, constraints, requirement) to the DRM content |
| Rights Credentials | M | Decryption key information of the DRM content included in the license |

Components in the message of Table 5 are transferred to the DRM PSA 110, and the DRM PSA 110 generates a license suitable for the DRM agent 120 by converting the access right (Rights Descriptor) to a rights expression language (e.g., OMA DRM REL) subordinate to a specific DRM.

The DRM PSA 110, having received the CDI response message in step 1209, extracts the common license from the CDI response message, and converts the common license to a license according to a format of the DRM system specified by the DRM agent 120, in step 1211.

Further, the DRM PSA 110 transfers the converted license to the DRM agent 120 through the NDI, in step 1213.

Although the license acquisition process is described as starting at the service providing apparatus 200, the license acquisition process can be started by the DRM agent 120. The CDI trigger message is not transmitted from the service providing apparatus 200, and the remaining processes are similar to steps 1205 to 1213.

Further, the service providing apparatus 200 can include the common license in the CDI trigger message. The trigger type of the CDI trigger message is designated as "license provisioning". The DRM PSA 110 performs similar processes to steps 1211 and 1213.

FIG. 10 is a diagram illustrating a process of resolving an error generated in communication between the DRM PSA 110 and the DRM agent 120, according to an embodiment of the present invention.

Referring to FIG. 10, the DRM PSA 110 detects the generation of an error event in the communication between the DRM PSA 110 and the DRM agent 120, in step 1301. The error event may include, for example, a case where the DRM PSA 110 receives a request message, which the DRM PSA 110 cannot process, from the DRM agent 120 through the NDI.

The DRM PSA 110 transmits an error identification request message by including error contents in the CDI request message, designating the request type as "opaque", and transmitting the CDI request message to the service providing apparatus 200, in step 1303. The CDI request message includes the error contents (non-processable request), which can be used for grasping an error condition, and other information. An example of the CDI error identification request message is shown in Table 6 below.

TABLE 6

| Parameter | M/O | Description |
| --- | --- | --- |
| Opaque Data | M | This refers to data received from the DRM agent but non-processable. This field may include the following parameter. Type: information type (e.g. metering data) |
| Context Data | M | This intends to inform the service providing |

TABLE 6-continued

| Parameter | M/O | Description |
| --- | --- | --- |
| | | apparatus of information on a cause of the generation of the non-processable request. |

The service providing apparatus 200 processes the error identification request, includes a response to the error identification request in the CDI response message, and transmits the CDI response message to the user terminal 100, in step 1305. The response type of the CDI response message is designated as "opaque".

The CDI error response message may include a solution of the error contents (non-processable request). Further, the CDI response message can be used for transmitting information on how to handle the error to the DRM PSA 110. In addition, a protocol subordinate to the DRM can be started. Alternatively, an operation for resolving the error contents can be started by transmitting the CDI trigger message, instead of the CDI response message, to the DRM PSA 110. An example of the CDI error response message is shown in Table 7 below.

TABLE 7

| Parameter | M/O | Description |
| --- | --- | --- |
| Opaque Data | M | This refers to a response to the generated error sent by the service providing apparatus, and should be transferred to the DRM agent. This field may include the following parameter. Type: a type of included information |
| PSA Instructions | M | This refers to information informing of an operation which the DRM PSA should perform to resolve the generated error. |

After receiving the CDI response message or the CDI trigger message, the DRM PSA 110 operates according to information included in the message. In general, the DRM PSA 110 transfers the response, which is transmitted from the service providing apparatus 200, to the DRM agent 120 through the NDI, in step 1307, or can execute a protocol related to the DRM system supported by the DRM agent 120.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A user terminal apparatus for consuming Digital Rights Management (DRM) content and providing a DRM service, the user terminal apparatus comprising:
    a transceiver for receiving a license corresponding to the DRM content from a service providing apparatus; and
    a processor for:
        transmitting a report message to the service providing apparatus, the report message including an identifier of the user terminal apparatus and information on a type of a first DRM system installed in the user terminal apparatus;
        determining whether the received license is a common license having a common format for supporting DRM content which is not supported at the service providing apparatus;
        converting the common format of the common license to a format of the first DRM system and transferring the converted license to a DRM agent of the user terminal apparatus, based on determining that the received license is the common license; and
transferring the received license to the DRM agent based on determining that the received license is not the common license.

2. The user terminal apparatus as claimed in claim 1, wherein the received license comprises information on a decryption key capable of decrypting the DRM content and an access right for the DRM content.

3. The user terminal apparatus as claimed in claim 1, wherein the processor converts a common format of a first message received at the transceiver from the service providing apparatus, and a format of information included in the first message, to the format of the first DRM system, and transfers the first message to the DRM agent, and wherein the processor converts a format of a second message received from the DRM agent and a format of information included in the second message to the common format of the first message and transfers the second message to the service providing apparatus.

4. The user terminal apparatus as claimed in claim 3, wherein the DRM agent prepares for license acquisition according to a protocol of the first DRM system and transfers a license request message having the format of the first DRM system to the processor when the DRM agent is prepared for license acquisition, and wherein the processor converts the format of the license request message to the common format of the common license, transmits the license request message to the service providing apparatus through the transceiver, and receives a license response message including the license having the common format of the common license.

5. The user terminal apparatus as claimed in claim 1, wherein the processor receives an acquisition request message for the license from the service providing apparatus, converts a common format of the acquisition request message to the format of the first DRM system, and transfers the acquisition request message to the DRM agent, and wherein the DRM agent prepares for license acquisition according to reception of the acquisition request message.

6. The user terminal apparatus as claimed in claim 1, wherein the processor stores information used for authentication of the DRM agent when the user terminal apparatus is registered in the service providing apparatus, performs the authentication of the DRM agent according to a protocol of the first DRM system when a registration request message for the user terminal apparatus is received from the service providing apparatus, and transmits the report message informing that the authentication has been successfully performed to the service providing apparatus.

7. The user terminal apparatus as claimed in claim 1, wherein the processor transmits an error identification request message comprising contents of an error to the service providing apparatus when the error is generated in a process of communication with the DRM agent, receives an error response message comprising resolution information on the error from the service providing apparatus, converts a common format of the resolution information to the format of the first DRM system, and transfers the error response message to the DRM agent.

8. A user terminal apparatus for consuming Digital Rights Management (DRM) content and providing a DRM service, the user terminal apparatus comprising:
a DRM server agent configured for:
transmitting a report message to a service providing apparatus, the report message including an identifier of the user terminal apparatus and information on a type of a first DRM system installed in the user terminal apparatus;
acquiring a license corresponding to the DRM content from the service providing apparatus that provides the DRM content;
determining whether the acquired license is a common license having a common format for supporting DRM content which is not supported at the service providing apparatus;
converting the common format of the common license to a format of the first DRM system and transferring the converted license to a DRM agent of the user terminal apparatus, based on determining that the acquired license is the common license; and
transferring the acquired license to the DRM agent based on determining that the acquired license is not the common license.

9. The user terminal apparatus as claimed in claim 8, wherein the acquired license comprises information on a decryption key capable of decrypting the DRM content and an access right for the DRM content.

10. The user terminal apparatus as claimed in claim 8, wherein the DRM server agent is further configured for:
receiving an acquisition request message for the license from the service providing apparatus;
converting a common format of the acquisition request message to the format of the first DRM system and transferring the acquisition request message to the DRM agent supporting the first DRM system;
preparing for license acquisition according to a protocol of the first DRM system;
transmitting a license request message to the service providing apparatus; and
receiving a license response message including the license having the common format of the common license.

11. The user terminal apparatus method as claimed in claim 8, further comprising:
receiving a registration request message for the user terminal apparatus from the service providing apparatus;
performing authentication for the DRM agent installed in the user terminal apparatus to provide the DRM service according to a protocol of the first DRM system; and
transmitting the report message informing that the authentication has been successfully performed to the service providing apparatus.

12. A method of providing a Digital Rights Management (DRM) service by a service providing apparatus that provides DRM content in a service environment that provides the DRM content by using a plurality of incompatible DRM systems, the method comprising the steps of:
receiving a report message from a user terminal apparatus, the report message including an identifier of the user terminal apparatus and information on a type of a second DRM system installed in the user terminal apparatus;
registering the user terminal apparatus in the service providing apparatus;
generating a license corresponding to the DRM content, wherein the generated license has a format of a first DRM system supported by the service providing apparatus;
determining whether a user terminal apparatus that is to receive the generated license, through a DRM proxy server agent that is a common DRM interface between the service providing apparatus and the user terminal apparatus, is equipped with the second DRM system that is different from the first DRM system, based on the information on the type of the second DRM system installed in the user terminal apparatus;

converting the format of the generated license to a format of the common DRM interface and transmitting the converted license to the user terminal apparatus through the common DRM interface, based on determining that the user terminal apparatus is equipped with the second DRM system; and transmitting the generated license to the user terminal apparatus based on determining that the user terminal apparatus is not equipped with the second DRM system.

13. The method as claimed in claim 12, wherein the license comprises information on a decryption key capable of decrypting the DRM content and an access right for the DRM content.

14. The method as claimed in claim 12, wherein the license is included in a license response request message and the license response request message is transmitted to the user terminal apparatus through the common DRM interface in response to a license request message received from the user terminal apparatus through the common DRM interface.

15. The method as claimed in claim 12, further comprising:
transmitting a user terminal registration request message to the user terminal apparatus through the common DRM interface; and
receiving, from the user terminal apparatus through the common DRM interface, the report message informing that an authentication for a DRM agent installed in the user terminal apparatus, which provides a DRM service according to a protocol of the second DRM system, has been successfully performed.

16. A service providing apparatus for providing Digital Rights Management (DRM) content and providing a DRM service in a service environment that provides the DRM content by using a plurality of incompatible DRM systems, the service providing apparatus comprising:
a service provider for storing information on types of DRM systems installed in a plurality of user terminal apparatuses;
a DRM server for supporting a first DRM system and generating a license corresponding to the DRM content, wherein the generated license has a format of the first DRM system; and
a common domain manager for:
receiving a report message from a user terminal apparatus, the report message including an identifier of the user terminal apparatus and information on a type of a second DRM system installed in the user terminal apparatus;
registering the user terminal apparatus in the service providing apparatus;
determining whether the user terminal apparatus that is to receive the generated license is equipped with the second DRM system that is different from the first DRM system, based on the information on the type of the second DRM system installed in the user terminal apparatus;
converting the format of the generated license to a format of a common DRM interface and transmitting the converted license to the user terminal apparatus through the common DRM interface based on determining that the user terminal apparatus that is to receive the generated license, through a DRM proxy server agent that is the common DRM interface between the service providing apparatus and the user terminal apparatus, is equipped with the second DRM system that is different from the first DRM system; and
transmitting the generated license to the user terminal apparatus based on determining that the user terminal apparatus is not equipped with the second DRM system.

17. The service providing apparatus as claimed in claim 16, wherein the license comprises information on a decryption key capable of decrypting the DRM content and an access right for the DRM content.

18. The service providing apparatus as claimed in claim 16, wherein the common domain manager converts a format of a first message received from the user terminal apparatus through the common DRM interface, and a format of information included in the first message, to the format of the first DRM system, and transfers the first message to the DRM server, and wherein the common domain manager converts a format of a second message received from the DRM server and a format of information included in the second message to the format of the common DRM interface, and transfers the second message to the user terminal apparatus.

19. The service providing apparatus as claimed in claim 16, wherein the common domain manager transmits a license response request message including the license to the user terminal apparatus through the common DRM interface in response to a license request message received from the user terminal apparatus through the common DRM interface.

20. The service providing apparatus as claimed in claim 19, wherein the license request message is received in response to a license acquisition request message transmitted to the user terminal apparatus through the common DRM interface.

21. The service providing apparatus as claimed in claim 16, wherein the common domain manager transmits a user terminal registration request message to the user terminal apparatus through the common DRM interface and receives, from the user terminal apparatus through the common DRM interface, the report message informing that an authentication for a DRM agent installed in the user terminal apparatus, which provides the DRM service according to a protocol of the second DRM system, has been successfully performed.

* * * * *